Dec. 28, 1954  D. P. ECKMAN  2,698,023
FLUID RELAY

Filed Nov. 15, 1947  2 Sheets-Sheet 1

*INVENTOR.*
DONALD P. ECKMAN

BY Arthur H. Swanson

ATTORNEY

Dec. 28, 1954 D. P. ECKMAN 2,698,023
FLUID RELAY
Filed Nov. 15, 1947 2 Sheets-Sheet 2
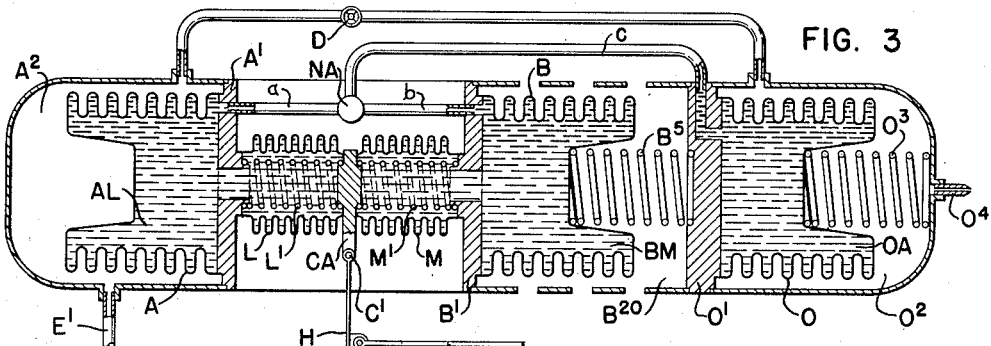
FIG. 3
FIG. 4
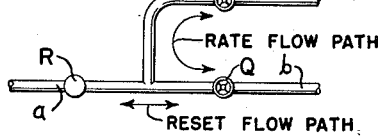
FIG. 5
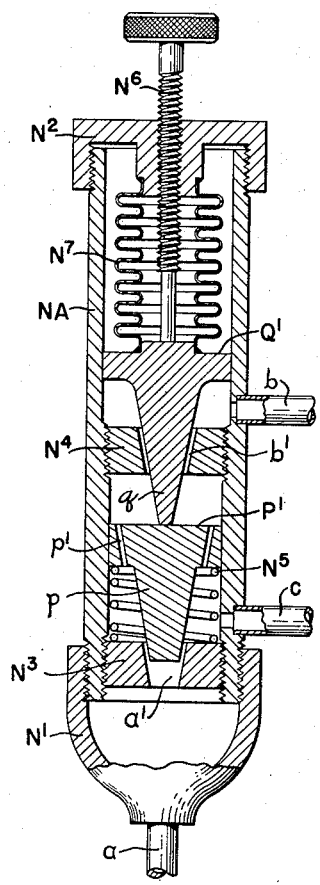
FIG. 6
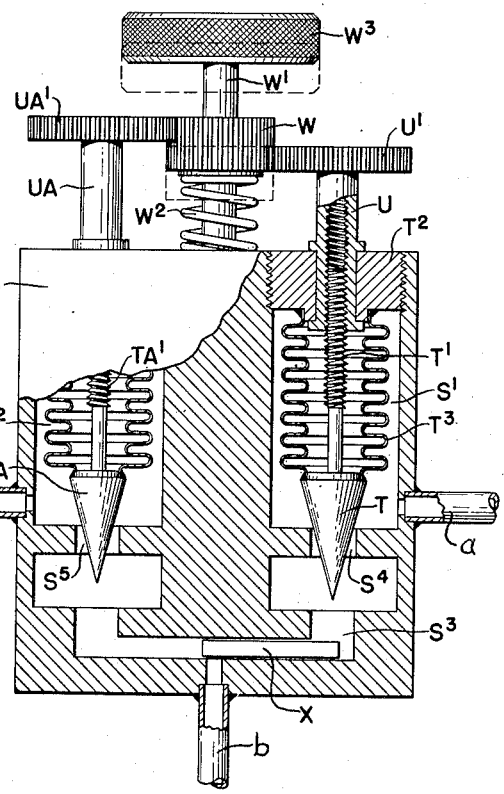
*INVENTOR.*
DONALD P. ECKMAN
BY
*Arthur H. Swanson*
ATTORNEY

United States Patent Office 2,698,023
Patented Dec. 28, 1954

2,698,023

FLUID RELAY

Donald P. Eckman, Ithaca, N. Y., assignor, by mesne assignments, to Minneapolis-Honeywell Regulator Company, Minneapolis, Minn., a corporation of Delaware Application November 15, 1947, Serial No. 786,245

10 Claims. (Cl. 137—86)

The general object of the present invention is to provide air control units with improved means for effecting proportional regulation with a variable throttling range or proportional band. Primary objects of the invention are to avoid defects or disadvantages which are characteristic of the throttling range adjustment provisions of air controllers now in general use. More specifically, the object of the present invention is to provide an air controller unit with simple and effective pneumatic means for varying the throttling range of the controller.

Heretofore, it has been the customary practice to vary the throttling range of an air controller by adjusting a mechanical linkage connection between the adjustable flapper or throttling valve element associated with the bleed nozzle of the air controller, and a movable follow-up element of the controller. In an air controller embodying the present invention, the controller throttling range can be varied by the adjustment of a simple throttling valve in a conduit connection between two associated air chambers, each of which has a movable wall. One of said chambers may be especially provided for the purposes of the present invention, but the other chamber is the regular control pressure chamber of the air controller and has a movable wall which by its movements adjusts the follow-up mechanism which has its throttling range varied by the use of the invention.

The present invention may take various forms and is adapted for use with air controllers which may or may not have reset and/or rate response provisions combined with their respective follow-up mechanisms.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described preferred embodiments of the invention.

Of the drawings:

Fig. 3 is a diagrammatic view illustrating the use of the present invention in an air controller adapted to give proportional control with reset and rate response;

Fig. 4 is a diagram illustrating a modification of the chamber connecting conduit arrangement shown in Fig. 3;

Fig. 5 is a sectional elevation of a valve mechanism employed in Fig. 3; and

Fig. 6 is a sectional elevation of a multiple valve mechanism adapted for use in a modification of the conduit arrangement shown in Fig. 4.

Figure 1:
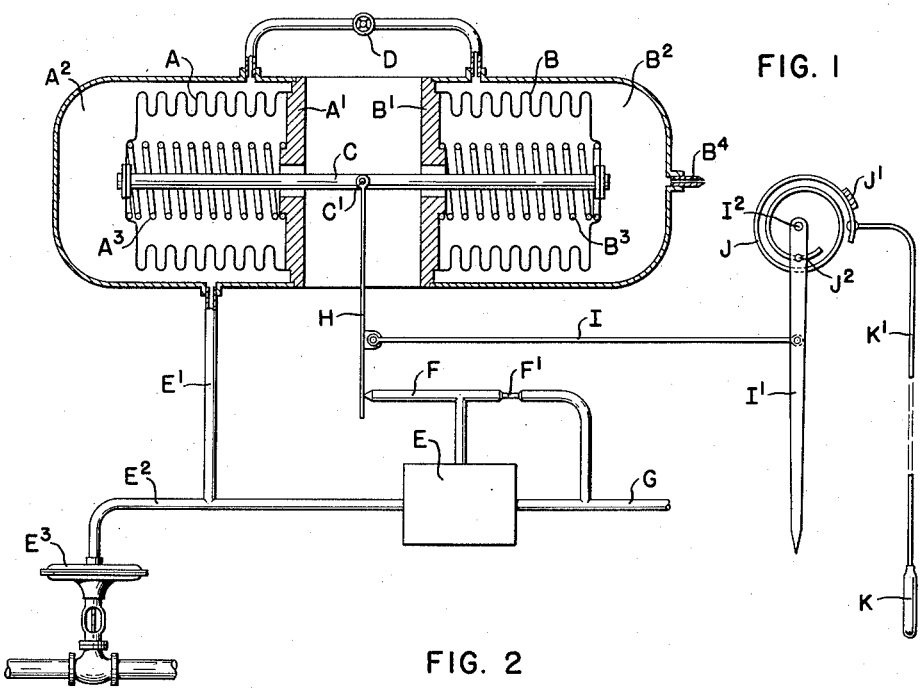
Fig. 1 is a diagrammatic view illustrating the use of the present invention in a control unit of the simple throttler type.

In Fig. 1, I have illustrated an air controller of the simple proportional control throttler type which does not include rate response or reset means, but does include a desirable form of the means which I have devised for varying the throttling range of such a controller. The air controller shown in Fig. 1 comprises an expansible element A of the bellows type having a closed movable end wall at one end of a corrugated tubular body and having the other end of said body connected to a stationary support A'. The latter is formed with a central aperture through which the interior of the bellows element A is in free communication with the atmosphere. The element A forms a movable portion of the wall of a control pressure chamber $A^2$. A follow-up rod C coaxial with the element A and having one end attached to the movable end wall of said element, has its other end connected to the movable end of a second expansible element B. The latter is coaxial with the bellows element A and may be a counterpart of the latter. The stationary end of the element B is secured to a stationary support B' which is in juxtaposed relation to the part A' and is formed with a central opening through which the interior of the element B is in free communication with the atmosphere.

The follow-up rod C, which is coaxial with each of the elements A and B, extends through, but does not close the central opening in each of the stationary supports A' and B'. The rod C and movable ends of the bellows elements A and B have respective normal positions to which they are biased by spring force. In the preferred construction illustrated, each of the corrugated tubular bodies of the elements A and B is formed of spring metal and has a natural resiliency, and may provide all or a portion of a spring bias force tending to hold the rod C and movable ends of the elements A and B in their respective normal positions. As shown, however, the spring bias action tending to hold the parts in their normal position, while partly due to the natural resiliency of the bellows elements, is largely due to helical bias springs $A^3$ and $B^3$. The spring $A^3$ surrounds the rod C and acts between the closed end of the bellows element A and the support A'. Similarly, the spring $B^3$ surrounds the rod C and acts between the closed end of the bellows element B and bellows support B'. The element B forms a movable wall portion of an expansible pressure chamber $B^2$. The chamber $B^2$ is in restricted communication with the atmosphere through a bleed orifice $B^4$ and is connected to the pressure chamber $A^2$ by a conduit including a throttling valve D.

In the operation of the apparatus shown in Fig. 1, the control pressure maintained in the chamber $A^2$ is the output pressure of a pilot valve E which is shown as having one outlet branch E' connected to the chamber $A^2$, and having a second outlet branch $E^2$ connected to a fluid pressure regulator $E^3$. The pilot valve E may be of conventional type and form, being biased by spring or other suitable means toward its closed position, and is used to maintain its output pressure in predetermined proportion to the nozzle pressure in a bleed nozzle F. The latter is connected through a restriction F' to an air supply pipe G. The latter may be connected to any available source of air under a suitable, and suitably constant pressure, which may be seventeen pounds per square inch, or so. The pressure in the nozzle F is controlled by a flapper valve H movable toward and away from the orifice in the discharge end of the nozzle F to thereby variably throttle the discharge of air to the atmosphere through said nozzle, and thus vary the nozzle pressure.

As diagrammatically shown, the valve H is moved toward and away from the nozzle F by a link I given reciprocating movements in a direction generally parallel to that of the rod C on changes in the value of a controlled variable. Such movements of the valve H result in variations in the pilot valve output pressure which are transmitted to the control pressure chamber $A^2$ and thereby give movements to the movable end wall of the bellows element A and to the follow-up rod C. Each movement thus given to rod C gives a follow-up adjustment to the flapper valve H which eliminates a portion of the change in the nozzle pressure produced by the preceding adjustment of the valve H effected through the link I.

As diagrammatically shown in Fig. 1, the flapper valve H is suspended at its upper end from a pivot C' which is carried by and shares the follow-up movements of the follow-up rod C. Intermediate its ends, the flapper valve H is pivotally connected to one end of the link I. The second end of the link I is connected to means responsive to variations in the value of the controlling variable. To this end, the second end of the link I is shown as pivotally connected to a pen arm I' or analogous element which is pivoted at $I^2$ and deflects on and in accordance with variations in the fluid pressure transmitted to the fixed outer end J' of a Bourdon tube spiral J. The latter has its movable inner end $J^2$ connected to the deflecting element $I'$ adjacent its supporting pivot $I^2$. As diagrammatically shown by way of example in Fig. 1, a fluid pressure thermometer bulb K transmits a pressure varying with the temperature of the bulb to the Bourdon tube spiral J through a pipe $K'$. The temperature to which the bulb K is subjected may be a furnace temperature regulated by the rate at which fuel is supplied to the furnace through the regulator $E^3$. In such case, the fluid flow through the valve $E^3$ is the manipulated variable, and the temperature to which the thermometer K responds is the controlled variable of the process controlled by the air controller shown in Fig. 1.

In operation, on a decrease in the temperature to which the thermometer K is subjected, the convolutions of the spiral Bourdon tube tighten up and thereby give a counterclockwise adjustment to the deflecting element I and to the flapper valve H. The resultant movement of the flapper valve H toward the nozzle F, increases the pressure in the nozzle, and thereby operates through the pilot valve E to correspondingly increase the output pressure of the pilot valve E which is transmitted through the branch pipes $E'$ and $E^2$ to the pressure chamber $A^2$ of the air controller and to the pressure chamber of the regulator valve $E^3$, respectively.

The pressure increase thus transmitted to the regulator valve $E^3$ gives the latter an opening adjustment and thus tends to increase the furnace temperature measured by the thermometer K. The pressure transmitted to the pressure chamber $A^2$ subjects the bellows element A to a force which shortens or contracts the latter, and thereby gives the rod C a longitudinal adjustment to the right. When the rod C is moved to the right, it gives the flapper valve a clockwise adjustment about the axis of its pivotal connection with the link I. That adjustment is a follow-up adjustment which moves the flapper valve H away from the nozzle F to decrease the throttling effect of the flapper valve H on the discharge through the nozzle F and thus eliminate some of the increase in the nozzle pressure produced by the previous movement of the valve H toward the nozzle. Conversely, on an increase in the temperature to which the thermometer K responds, the Bourdon spiral J and deflecting element $I'$ give a clockwise adjustment to the flapper H. That adjustment reduces the pressure in the nozzle F and in the chamber $A^2$ and thus tends to produce a follow-up adjustment of the rod C to the left with a resultant movement of the flapper H back toward the nozzle F.

The follow-up adjustment of the flapper valve H produced as described on a given increase in the control pressure transmitted by the pilot valve to chamber $A^2$, may be widely varied by adjustment of the throttling valve D through which the chambers $A^2$ and $B^2$ are connected. Thus if the valve D is wide open, the pressure in the chamber $B^2$ will be approximately equal to the pressure in the chamber $A^2$ at all times, and the controller will operate as an on–off controller with no significant follow-up action. In such case the pressure in the pipe $E^2$ will move the valve $E^3$ into its wide open position whenever the temperature of the thermometer K falls below the normal or control point temperature, and will permit the valve $E^3$ to move into its fully closed position whenever the thermometer rises above a normal or control point value.

However, if the throttling valve D is fully closed, the pressure in the chamber $A^2$ is not transmitted to the chamber $B^2$. An increase or decrease in the pressure in the chamber $A^2$ then produces a longitudinal movement of the rod C of the magnitude required to restore balance between the thrust of the air pressure in the chamber $A^2$ on the bellows A, and the resultant of the other forces acting on the bellows A. Those other forces include those due to the resiliency of the bellows elements A and B, and of the springs $A^3$ and $B^3$, and to the air pressure in the chamber $B^2$ and to the resultant axial thrust, if any, of the pressure of the atmosphere against the external surfaces of the bellows A and B in the chamber $A^2$ above the atmospheric pressure within the bellows element.

With the valve D only partly closed, the throttling range will be correspondingly smaller than when the valve is fully closed. As those skilled in the art will recognize, the apparatus shown may be proportioned and adjusted to make the throttling range or proportioning band as wide as conditions may make practically desirable. In practice, the throttling range of such an air controller ordinarily varies between a minimum in which the valve $E^3$ will be adjusted between its wide open and fully closed positions by a deflection of the element I which is a fraction only of the full scale deflection of that element, and a maximum in which full scale deflection of the element I will result in an adjustment of the valve $E^3$ through a fraction only of its total range of adjustment.

The controller shown in Fig. 1 is much simpler from the mechanical standpoint than controllers now in general use having the same general operative characteristics. Thus, for example, in one type of such controller now in extensive use, and illustrated and described in the Moore Patent 2,125,081 of July 26, 1938, the throttling range adjustment is effected by means comprising two generally parallel levers and a thrust member adjustable longitudinally of the levers, through which one lever acts on the other to transmit motion to a flapper valve from a rod, corresponding respectively to the flapper valve H and rod C herein.

Figure 2:
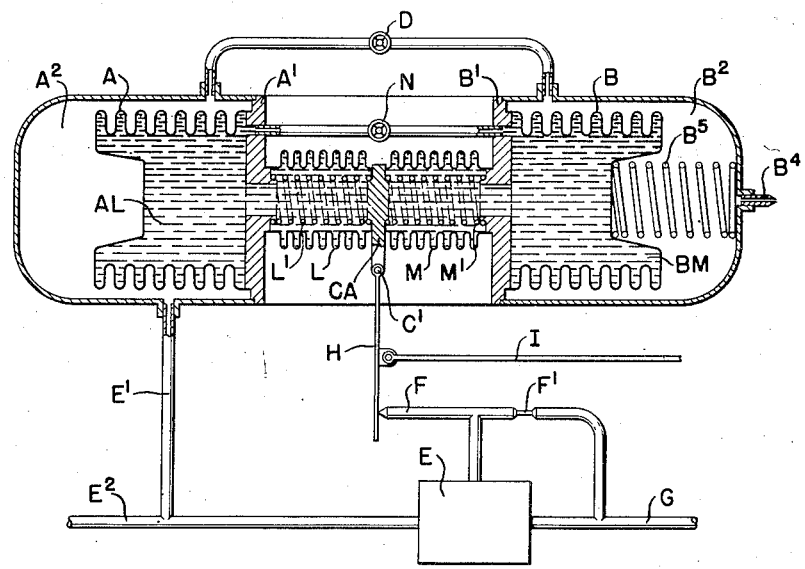
Fig. 2 is a view illustrating the use of the present invention in an air controller adapted to give proportional control with reset.

As previously indicated, the throttling range adjustment improvement disclosed herein is well adapted for use in controllers quite different from the simple throttling controller shown in Fig. 1. Thus, in Fig. 2, I have illustrated the use of my improved throttling range adjusting means in an air controller of a well known throttling and reset type. The apparatus shown in Fig. 2 differs from the apparatus shown in Fig. 1 primarily in that a bellows L is associated with the bellows A to form a liquid containing chamber AL, and in that a bellows M is similarly associated with the bellows element B to form a second liquid containing space or chamber BM, which is connected to the space AL by a passage including a valve N. In the desirable form of the invention illustrated in Fig. 2, the bellows elements L and M are between the supports $A'$ and $B'$, and each has its movable end connected to the movable end of the other by a floating partition CA. The ends of the bellows elements L and M remote from the partition CA are connected to the adjacent sides of the supports $A'$ and $B'$, respectively. Ordinarily, and as shown, the bellows elements A, B, L and M are all coaxial. The chambers $A^2$ and $B^2$ into which the bellows elements A and B respectively extend, are connected through a throttling valve D, as in Fig. 1. In Fig. 2, the bellows element B is subjected to a contracting force by an external helical spring $B^5$, acting between the movable end of the element B and the outer wall of the chamber $B^2$. The latter is formed with a bleed orifice $B^4$ as in Fig. 1.

The partition member CA is biased to a normal intermediate position by a helical spring $L'$ acting between the partition CA and support $A'$, and a helical spring $M'$ acting between the partition CA and bellows support $B'$. When as a result of an increase or decrease in the pressure transmitted from the pilot valve E to the control pressure chamber $A^2$, the partition CA is moved away from its normal position to the right or left respectively, a spring bias force is created which tends to return the partition to its normal position as the pressures in the chambers AL and BM are more or less slowly equalized as a result of flow past the valve N. As diagrammatically shown, the flapper valve H of Fig. 2 is suspended from a pivot $C'$ carried by the partition member CA, and the flapper valve H is thus given clockwise and counterclockwise adjustments about the axis of its pivot connection $I'$ by movements of the partition CA to the right and left, respectively.

In operation, an increase or a decrease in the pressure transmitted to the pressure chamber $A^2$ of Fig. 2 from the pilot valve E, results in a substantial follow-up adjustment of the partition CA to the right or to the left, when the valve D is closed, and results in little movement of the partition CA when the valve D is wide open. With the valve D closed sufficiently to produce a significant follow-up adjustment of the member CA, following an elongation or contraction of the bellows A, a substantial reset or compensating effect is obtained as a result of the flow of liquid between the chambers AL and BM through the valve N. The effect of that flow is to give the partition member CA a return movement and thereby neutralize more or less of the follow-up adjustment previously given by said partition to the flapper valve H.

Fig. 3 illustrates an embodiment of the invention in a controller including a rate response component and valve means for simultaneously adjusting the reset rate and the rate time. Structurally, the controller shown somewhat diagrammatically in Fig. 3 is generally like the controller shown in Fig. 2, except for the addition of a rate response unit. The latter, as shown, comprises an expansible liquid containing space OA having its wall formed by a corrugated tubular bellows element O and a stationary bellows support O' which is parallel to and displaced to the right from the bellows support B'. The element O has its right end closed and movable, and has its left end attached to and closed by the support O'. The support O' serves as an abutment for the right end of the spring $B^5$ which acts against the right end of the bellows element B in Fig. 3 as in Fig. 2. The bellows element O may be a counterpart of the bellows elements A and B and is located within a chamber $O^2$ having a bleed orifice $O^4$ respectively similar to the chamber $B^2$ and the bleed orifice $B^4$ of Fig. 2. In Fig. 3, the chamber space $B^{20}$ surrounding the bellows B is in free communication with the atmosphere. A spring $O^3$ acts between the movable right end of the bellows element O and the right end wall of the chamber $O^2$. A throttling valve D controls communication between the chamber $O^2$ and the chamber $A^2$.

The liquid containing spaces AL, BM and OA are inter-connected by means comprising pipes $a$, $b$ and $c$ which respectively connect the chambers AL, BM and OA to a compound valve NA which is adjustable to regulate the reset rate and rate time of the controller. The valve NA is shown in section in Fig. 5 to which further reference is hereinafter made. At this point, attention is directed to the arrangement shown in Fig. 4, in which the general operative results obtainable with the compound valve NA are obtainable with an arrangement in which each of the pipes $a$, $b$ and $c$ is directly connected to each of the others and in which throttling valves P and Q are included in the pipes $c$ and $b$, respectively, and in which a flow restricting device R, which may or may not be adjustable, is included in the pipe $a$.

In the operation of the apparatus collectively shown by Figs. 3 and 4, the rate action serves to retard the follow-up adjustment of the flapper valve H which follows, and partially neutralizes, the change in the control pressure produced by the adjustment of the valve H on, and in response to, a change in the controlling condition. The ultimate effect of the retardation of the follow-up action is an increase or decrease in the amount of fuel supplied by the valve $E^3$ during the period in which the retarded follow-up action is effected, relative to the amount of fuel which would be supplied during the same period if the follow-up action were completed prior to the end of the period. The change in the rate of fuel supplied due to the rate action, is an increase or a decrease accordingly as the actuating change in the controlling condition is in the direction to move the valve H respectively toward or away from the nozzle F.

The retardation of the follow-up action of the controller shown in Fig. 3, is a direct result of the flow of liquid through the pipes $b$ and $c$ from the liquid chamber BM into the liquid chamber OA, or from the last mentioned chamber into the chamber BM, accordingly as the proceding change in the control pressure was an increase or a decrease. When the element I moves the valve H toward the nozzle F, the resultant increase in the control pressure in the chamber $A^2$ increases the pressure in the chambers AL and BM and compresses the spring $B^5$, and thus results in a movement of the partition CA to the right which produces a prompt, but small follow-up adjustment of the valve H. This initial follow-up action is followed by a slow final follow-up action which results from the movement of liquid through the pipes $b$ and $c$ from the chamber BM into the chamber OA. That flow continues until the pressures in the chambers BM and OA are equalized. The resultant decrease in the amount of liquid in the chamber BM results in a corresponding movement of the partition CA to the right.

When the member I moves the valve H away from the nozzle F, the control pressure in the chamber $A^2$ is reduced and effects a corresponding reduction in the pressures in each of the liquid spaces AL and BM. This results in a small immediate follow-up movement of the partition CA to the left. The reduction in the control pressure also results in a reduction in the pressure of the liquid in the chamber BM. In consequence, liquid then flows into the chamber BM from the chamber OA through the pipes $c$ and $b$.

When a follow-up movement of the member CA in either direction, resulting from a change in the control pressure in the chamber $A^2$, is completed, a reset movement of the partition member CA is initiated as a result of the fact that the liquid pressures in the chambers AL and BM are then unequal. When the preceding follow-up movement of the partition CA was to the left as a result of a pressure decrease in the chamber $A^2$, the pressure in the chamber BM will be higher than the pressure in the chamber AL and air will then flow through the pipes $b$ and $a$ from the chamber BM into the chamber AL until the pressures in the two chambers become equal. Conversely, when the control pressure in the chamber $A^2$ is increased so that there is an initial follow-up movement of the partition CA to the right, the pressure in the chamber AL will exceed the pressure in the chamber BM, and there will then be a reset flow of liquid from the chamber AL into the chamber BM through the pipes $a$ and $b$.

The compound valve NA in the form shown by way of example in Fig. 5, comprises a tubular body which is externally threaded at its ends for the attachment of internally threaded cap members N' and $N^2$, and is internally threaded to receive apertured discs or valve seat members $N^3$ and $N^4$. The pipe $a$ is threaded into the hollow cap member N', and is in communication through the latter with the adjacent end of a tapered axial port $a'$ formed in the valve seat member $N^3$. Flow through the tapered port $a'$ is variably throttled by a coaxial tapered needle valve part $p$ which extends into the port $a'$. The valve part $p$ is an integral portion of a valve P' which also comprises a piston-like body portion, fitting, and axially movable, in the bore of the tubular body of the valve NA. The pipe $c$ is connected to the tubular body of the valve NA so as to open into the portion of said bore of said body between the valve seat member $N^3$ and the piston-like body portion of the valve P'. A spring $N^5$ acts between the body portion of the valve P' and the valve seat member $N^3$, in a direction tending to move the needle portion $p$ of the valve member P' out of the conical port $a'$.

The position of the valve member P' is controlled by the position of the associated valve member Q'. The latter comprises a piston-like body portion slidingly received in the tubular body of the valve NA. The valve Q' also comprises a conical, axially extending, needle valve portion $q$. The latter extends through a tapered or conical port $b'$ in the valve seat member $N^4$, and has its small end in engagement with the adjacent end of the valve member P'. The pipe $b$ is conected to the tubular body of the valve NA so as to open into the bore of that body between the piston-like body portion of the valve Q' and the valve seat member $N^4$. The valve P does not prevent flow between the pipes $b$ and $c$ because of the ports $p'$ formed in the piston body portion of said valve. The spring $N^5$ acts directly on the valve member P' and through the latter on the valve member Q' in the direction to give each valve member an opening adjustment. The valve member Q' may be moved in the closing direction against the action of the spring $N^5$ by a threaded valve spindle $N^6$. The latter extends through an axial threaded passage in the cap $N^2$. Leakage through the joint between the valve spindle $N^6$ and cap $N^2$ is prevented by a tubular bellows element $N^7$ surrounding the valve spindle $N^6$ and connected at one end to the valve member Q' and at the opposite end to the cap $N^2$.

In practice, the elements of the valve NA are so proportioned and adjusted that the flow between the pipes $a$ and $b$ through the port $a'$ is restricted by the throttling action of the needle valve portion $p$ of the valve P' to give the desired reset rate. The adjustment of the valve Q' determines the rate time by adjusting the conical portion $q$ of the valve member Q' to throttle the port $b'$ and thereby control the flow between the pipes $b$ and $c$. In the arrangement shown in Fig. 5, the channels $p'$ extending through the piston-like body portion of the valve member P' are so large as to provide substantially unrestricted communication between the spaces at opposite sides of said piston portion.

In operation, the adjustment of the valve member Q' controls the throttling effect of the valve part $q$ on the orifice $b'$ and thereby controls the flow between the pipes $b$ and $c$, and thus determines the rate time of the air controller action. Theoretically the reset rate depends upon the restriction to flow between the pipes $a$ and $b$ collectively due to the two partially throttled ports $b'$ and $a'$. In practice, however, the volume of the flow between pipes $a$ and $b$ is substantially dependent on and controlled by the partially throttled port $a'$, owing to the fact that the cross-sectional area of the flow path through the port $a'$ is substantially smaller than the cross-sectional area of the flow path through the port $b'$. The last mentioned area is determined, of course, by the rate response desired. In practice, it is generally desirable that increases and decreases in the rate time should be attended by corresponding increases and decreases in the reset rate. Under all ordinary conditions, however, in apparatus of the character shown in Fig. 3, the cross sectional area of the most restricted portion of the rate response flow path should be substantially greater than the most restricted portion of the cross-sectional area of the reset flow path.

In Fig. 6 I have illustrated a novel mechanism devised by me for simultaneously adjusting valves T and TA, respectively controlling the reset rate and time rate of apparatus of the kind shown in Fig. 3. The valve members T and TA are mounted in side by side valve chambers $S'$ and $S^2$ in a valve body S. The pipes $a$ and $c$ open into the chambers $S'$ and $S^2$, respectively, and the pipe $b$ opens into a channel $S^3$ which communicates at one end with the valve chamber $S'$ through a port $S^4$ and is connected adjacent its opposite end to the chamber $S^2$ through a port $S^5$. The ports $S^4$ and $S^5$ are subjected to variable throttling actions by the valves T and TA, respectively. The valve T is of conical form and coaxial with the chamber $S'$ and its outlet port $S^4$. A threaded valve spindle $T'$ is rigidly attached to the larger end of the valve T and extends into and is in threaded engagement with an internally threaded valve actuating member U. The latter is swivelled in a plug or valve chamber head $T^2$ secured in the end of the valve chamber $S'$ remote from the port $S^4$. Leakage through the joint between the thread connected valve stem $T'$ and operating member U is prevented by a bellows seal $T^3$ which surrounds the valve stem $T'$ and is secured at one end to the valve T and at its other end to the plug $T^2$. The valve actuator U carries a spur gear $U'$ at its upper end. The rotation of the gear $U'$ in one direction or in the opposite direction, respectively increases or decreases the throttling effect of the valve T on flow between the pipes $b$ and $a$ through the port $S^4$.

The valve TA and associated parts are respectively similar to the valve T and parts associated therewith, and the adjustment of the valve TA variably throttles flow through the port $S^5$ between the pipes as the adjustment of the valve T variably throttles flow through the port $S^4$. As shown, however, the operating member UA for the valve TA is longer than the member U so that the spur gear $UA'$ carried at its upper end is displaced upward from the plane of rotation of the gear $U'$. The gears $U'$ and $UA'$ may be simultaneously rotated to simultaneously adjust the valves T and TA by means of an elongated spur gear W. The gear W is secured to a spindle $W'$ mounted in the valve body S for rotation about its axis, and also for adjustment in the direction of its axis, to move the gear W between its positions shown in full and dotted lines in Fig. 6. A bias spring $W^2$ normally holds the gear W in its position shown in full lines, in which it is in mesh with each of the gears $U'$ and $UA'$. A knob $W^3$ is secured to the spindle $W'$ to facilitate its rotation. The valve stems $T'$ and TA are oppositely threaded as are the spindles U and UA. The rotation of the knob $W^3$ in one direction, moves the valves T and TA in the direction to increase the throttling effect of each valve, and a reverse rotation of the knob $W^3$ will adjust each of the valves T and TA in the direction to diminish the throttling effect of the valve $b'$. When the gear member W is depressed into its position shown in dotted lines in Fig. 6, and is then rotated, the valve T is, and the valve TA is not, axially adjusted. The resultant relative adjustments of the valves T and TA thus made possible are sometimes desirable for calibration purposes.

In general, however, with properly proportioned apparatus, simultaneous proportional adjustments of the valves T and TA are ordinarily desirable since with most processes the controller reset rate, commonly designated Y, and rate time, commonly designated $q$, of an air controller giving proportional control, are approximately linear functions of the period of oscillation of the controlled variable. Thus, when P represents the controlled variable period of oscillation in minutes:

$$Y = \frac{2}{P}, \text{ approximately,}$$

if Y represents the reset rate expressed in pounds per square inch change in the control pressure per minute, for each pound of control pressure deviation. In such case $$q = \frac{P}{8}, \text{ approximately,}$$

when $q$ represents the rate time expressed in minutes of advance of the proportional response. Thus, for example, if the oscillation period of the process controlled variable is ten minutes, the rate time will be approximately 1.25 minutes and the reset rate will be approximately 0.2 pound per square inch change in the control pressure per minute, for each pound of control pressure deviation. Similarly, if the process oscillation period is five minutes, the rate time will be approximately .63 of a minute, and the reset rate will be approximately 0.4 pound per square inch change in the control pressure per minute, for each pound of control pressure deviation.

With apparatus of the character shown in Fig. 3, an increase in the temperature of the air tends to increase the reset rate. This is automatically compensated for in the valve structure shown in Fig. 6 by the arrangement of a thermostatic element X in the chamber $S^3$ so that as the temperature of the element X increases, it expands and restricts the flow between pipes $a$ and $b$ and thus slows down the reset rate. Owing to the proportion and disposition of the parts, the expansion or swelling of the part X has no significant effect on the rate time. The thermostatic element X may well be an aluminum tube with an outside diameter but slightly smaller than the internal diameter of the passage $S^3$.

In all of its forms of embodiment illustrated, the invention has various inherent practically important advantages. Its use eliminates all need for the more or less complicated link and lever means heretofore customarily included in the flapper valve operating mechanism to permit throttling range adjustment. Such elimination reduces friction and lost motion and makes possible a simplified and more compact controller design. The invention also makes it readily feasible to locate the throttling range and reset adjusting valves at a distance from the air controller unit. The use of the invention permits the follow-up action to be initiated and completed in a relatively rapid and positive manner and thereby eliminates an undesirable tendency to oscillation. This advantage is inherent, not only in the embodiments of the invention shown in Figs. 1 and 2, but also in the embodiment shown in Fig. 3 in which the completion of the follow-up action is intentionally retarded to obtain rate response. In all of the forms of the invention, the throttling range can be regulated by a relatively small adjustment of a simple needle valve, full regulation being ordinarily obtainable with about three turns of the valve spindle. While not shown it is to be understood that a suitably calibrated scale may be provided, and is ordinarily to be desired in practice, in association with each of the adjustably rotatable elements of the various needle valves.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention, as set forth in the appended claims, and that in some cases certain features of my invention may be used to advantage without a corresponding use of other features.

Having now described my invention, what I claim as new and desire to secure by Letters Patent, is:

1. An air controller comprising in combination an expansible control pressure chamber, an expansible follow-up range control chamber, each of said chambers having walls including a wall portion movable to expand and contract the corresponding chamber, an unobstructed flow passage comprising the sole connection between said range control chamber and the atmosphere and being at all times open for the flow of fluid therethrough, a force transmitting connection between said movable wall portions which is substantially incompressible by the pressures maintained in said controller through which movement of either of said wall portions in the direction to expand or to contract the corresponding chamber, respectively contracts or expands the other chamber, means biasing said movable wall portions to respective predetermined positions, means for maintaining a regulable air pressure in said control pressure chamber comprising a throttling valve adjustable to vary said pressure, valve adjusting means including an element adjusted in accordance with variations in a controlling condition to thereby produce adjustments of said valve in accordance with said variations, and a second element adjusted on and in accordance with the movements of the movable wall portion of said control chamber to thereby produce negative feedback follow-up adjustments of said valve, a conduit connecting said chambers for the flow of air between them, and a throttling valve adjustable to variably restrict flow between said chambers through said conduit and to thus vary the throttling range of said controller.

2. An air controller as specified in claim 1, in which said movable wall members are coaxial tubular bellows elements each having one end fixed and the other end movable, and in which said force transmitting connection comprises a rod extending between and having its ends connected to the movable ends of said elements.

3. An air controller as specified in claim 1, in which the force transmitting connection between said movable walls is a strut comprising two end to end liquid containing sections having their abutting ends biased to normal positions and in which said liquid containers are in communication through a throttling device which may be adjusted to provide a variable reset action.

4. An air controller as specified in claim 1, in which the force transmitting connection between said movable walls comprises a spring abutment and first and second longitudinally expansible liquid containers arranged end to end between and respectively adjacent the movable control chamber wall and said abutment, means biasing the abutting ends of said liquid containers to normal positions, and in which the movable wall of said follow-up range control chamber also forms the movable wall of an expansible liquid container having its other end wall stationary, and including means providing restricted communication between said first and second liquid containers and providing restricted communication between said first and third liquid containers whereby said controller is adapted to effect proportional control with reset and rate response.

5. An air controller as specified in claim 1, in which the force transmitting connection between said movable walls comprises a spring abutment and first and second longitudinally expansible liquid containers arranged end to end between and respectively adjacent the movable control chamber wall and said abutment, means biasing the abutting ends of said liquid containers to normal positions, and in which the movable wall of said follow-up range control chamber also forms the movable wall of an expansible liquid container having its other end wall stationary, and including means through which each of the three liquid containers is in restricted communication with each of the other two liquid containers whereby said controller is adapted to provide proportional control with reset and rate response.

6. An air controller as specified in claim 1, in which the force transmitting connection between said movable walls comprises a spring abutment and first and second longitudinally expansible liquid containers arranged end to end between and respectively adjacent the movable control chamber wall and said abutment, means biasing the abutting ends of said liquid containers to normal positions, and in which the movable wall of said follow-up range control chamber also forms the movable wall of an expansible liquid container having its other end wall stationary, and including means providing a conduit connection between said first and second liquid containers and a conduit connection between said first and third liquid containers, and means for simultaneously increasing and for simultaneously decreasing the resistance to flow through each of said conduit connections whereby said controller is adapted to effect proportional control with regulated reset and rate response.

7. An air controller as specified in claim 6, in which the means for simultaneously increasing and decreasing the resistance to flow through said conduit connections comprise a separate throttling valve member in each connection, and means for simultaneously adjusting said valve members.

8. An air controller as specified in claim 6, in which the means for simultaneously increasing and decreasing the resistance to flow through each of said conduit connections comprises a separate valve in each conduit connection, and means optionally operable to simultaneously adjust both valves or to adjust one only of the two valves.

9. An air controller as specified in claim 1, in which the force transmitting connection between said movable walls comprises a spring abutment and first and second longitudinally expansible liquid containers arranged end to end between and respectively adjacent the movable control chamber wall and said abutment, means biasing the abutting ends of said liquid containers to normal positions, and in which the movable wall of said follow-up range control chamber also forms the movable wall of an expansible liquid container having its other end wall stationary, and including a conduit individual to each of said liquid containers and including a restriction and connected to the restriction containing conduits individual to the other two containers.

10. An air controller as specified in claim 9, including means for separately adjusting the restriction in two, at least, of said conduits whereby said controller is adapted to effect proportional control with separately regulable reset rate and rate time.

References Cited in the file of this patent

UNITED STATES PATENTS

| Number | Name | Date |
|---|---|---|
| 2,117,800 | Harrison | May 17, 1938 |
| 2,429,695 | McGrath | Oct. 28, 1947 |
| 2,518,244 | Moore | Aug. 8, 1950 |
| 2,520,468 | Moore | Aug. 29, 1950 |
| 2,588,839 | Horn | Mar. 11, 1952 |